(12) United States Patent
Cheng

(10) Patent No.: US 10,807,107 B2
(45) Date of Patent: Oct. 20, 2020

(54) CONTROL STRUCTURE CAPABLE OF ADJUSTING WATER VOLUME AND CONTROLLING WATER SUPPLY

(71) Applicant: Yuan Mei Corp., Chang Hua Hsien (TW)

(72) Inventor: Chi-Han Cheng, Chang Hua Hsien (TW)

(73) Assignee: Yuan Mei Corp. (TW)

( * ) Notice: Subject to any disclaimer, the term of this patent is extended or adjusted under 35 U.S.C. 154(b) by 224 days.

(21) Appl. No.: 15/943,906

(22) Filed: Apr. 3, 2018

(65) Prior Publication Data

US 2019/0299226 A1   Oct. 3, 2019

(51) Int. Cl.
*F16K 31/50* (2006.01)
*B05B 1/32* (2006.01)

(52) U.S. Cl.
CPC .............. *B05B 1/323* (2013.01); *F16K 31/50* (2013.01)

(58) Field of Classification Search
CPC ........ F16K 31/50; F16K 31/504; F16K 31/58; F16K 31/445; F16K 1/123; B05B 1/323; B05B 1/3013; B05B 1/3026; B05B 1/3033; B05B 1/304; B05B 1/3046; B05B 1/308; B05B 1/3066; B05B 1/3073
USPC .................. 251/284, 340, 346, 345
See application file for complete search history.

(56) References Cited

U.S. PATENT DOCUMENTS

| 3,856,262 | A | * | 12/1974 | Jordan | .................... F16K 3/265 251/340 |
| 4,159,103 | A | * | 6/1979 | Jordan | .................. F16K 31/445 251/284 |
| 6,341,762 | B1 | * | 1/2002 | Dean | ........................ B64G 1/26 137/800 |
| 8,915,264 | B2 | * | 12/2014 | Hillier | ....................... F16K 1/12 137/542 |
| 8,919,365 | B2 | * | 12/2014 | Hillier | ....................... F16K 1/12 137/1 |
| 2007/0235562 | A1 | * | 10/2007 | Lo | ......................... B05B 1/3026 239/390 |

* cited by examiner

*Primary Examiner* — Mary E McManmon
*Assistant Examiner* — Andrew J Rost
(74) *Attorney, Agent, or Firm* — Stinson LLP

(57) ABSTRACT

A control structure capable of adjusting water volume and controlling water supply contains: a body, a fixer, a valve stem, an adjuster, and a controller. The body includes a water outflow segment for connecting with a watering tool, an accommodation groove for accommodating the fixer and the valve stem. The fixer includes a flexible retaining rib, and the valve stem includes an inlet communicating with the water outflow segment, a fixing rib, an opening communicating with the inlet, and a guiding column. The guiding column has a seal ring. The fixing rib retains with the flexible retaining rib so as to limit a rotation of the adjuster along the body. The adjuster includes a threaded orifice screwing with a screwing section of the controller, an inflow aperture fitting with the guiding column, and a shoulder formed beside the inflow aperture. The controller is coupled with a water supply pipe.

14 Claims, 9 Drawing Sheets

CONTROL STRUCTURE CAPABLE OF ADJUSTING WATER VOLUME AND CONTROLLING WATER SUPPLY

TECHNICAL FIELD

The present disclosure relates to a control structure which is capable of adjusting water volume and controlling the water supply easily.

BACKGROUND

A conventional watering tool (such as a sprinkler, a water spray gun or a water supply pipe) adjusts its water volume from a supply end of the watering tool. For example, when water from an outflow end of the watering tool is too large or small, the water volume of the water is adjustable from the supply end of the watering tool, thus having inconvenient adjustment. Furthermore, when an adjuster is fixed with the watering tool, the water volume of the water is adjustable by operating the adjuster with a tool, such as a bolt, thus having troublesome operation.

SUMMARY

A primary aspect of the present invention is to provide a control structure which is capable of adjusting water volume and controlling the water supply easily.

To obtain above-mentioned aspect, a control structure provided by the present invention contains: a body, a fixer, a valve stem, an adjuster, and a controller.

The body includes a water outflow segment formed on a first end of the body and configured to connect with a watering tool, an accommodation groove configured to accommodate a fixer and a valve stem. The fixer includes a retaining rib arranged around an inner wall of the fixer. The valve stem includes an inlet defined in the valve stem and communicating with the water outflow segment of the body, a fixing rib arranged on a first end of the valve stem, an opening formed on a second end of the valve stem and communicating with the inlet, and a guiding column extending outward from a side of the opening. A diameter of the guiding column is less than the opening, and the guiding column has a seal ring fitted thereon. And the fixing rib of the valve stem retains with the retaining rib of the fixer so as to limit a rotation of an adjuster along the body. The adjuster includes a threaded orifice screwing with a screwing section on arranged an outer wall of the controller, an inflow aperture formed on a middle section of an inner wall of the controller and fitting with the guiding column, and a shoulder formed beside the inflow aperture, wherein the controller is coupled with a water supply pipe.

When the water from the water supply pipe is too large or small, the adjuster is rotated clockwise along the accommodation groove and the connection section of the body so that the threaded orifice of the adjuster drives the screwing section of the controller to remove, and the inflow aperture detaches from the two first seal rings of the guiding column, hence the water flows into the inlet from the opening of the valve stem and sprays out of the watering tool from the water outflow segment of the body. The adjuster is rotated continuously so as to increase a distance between the inflow aperture of the controller and the valve stem and to increase water volume. When the adjuster is rotated counterclockwise to drive the controller to move toward the guiding column, a distance between the inflow aperture of the controller and the guiding column decrease, such that the water column decreases. When the inflow aperture contacts with the second seal ring of the valve stem, the water stops flowing. In addition, the adjuster is limited by the valve stem 40 to rotate on an original position and to drive the controller to move forward and backward, thus changing the water volume easily.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
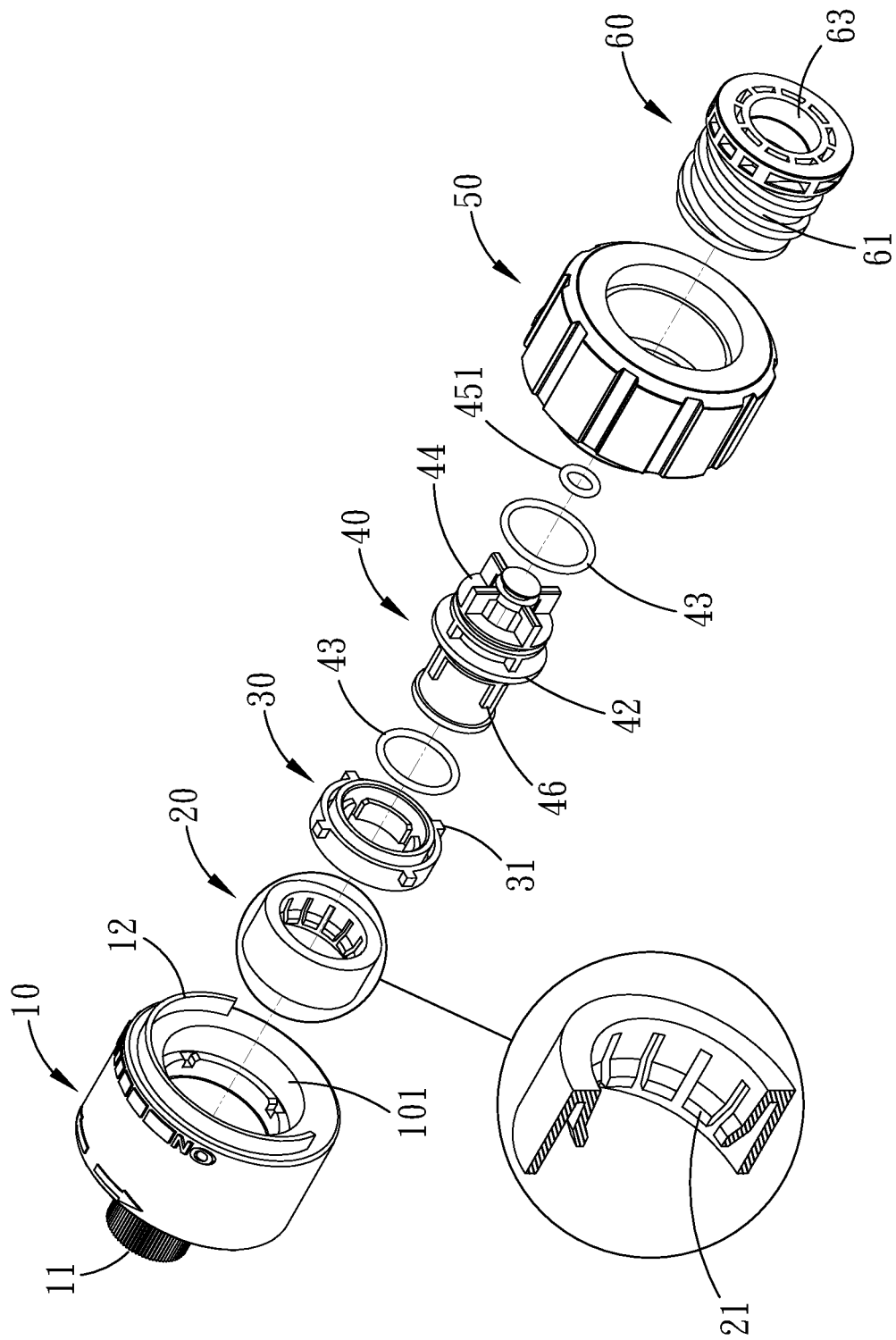
FIG. 1 is a perspective view showing exploded components of a control structure according to a preferred embodiment of the present invention.
Figure 2:
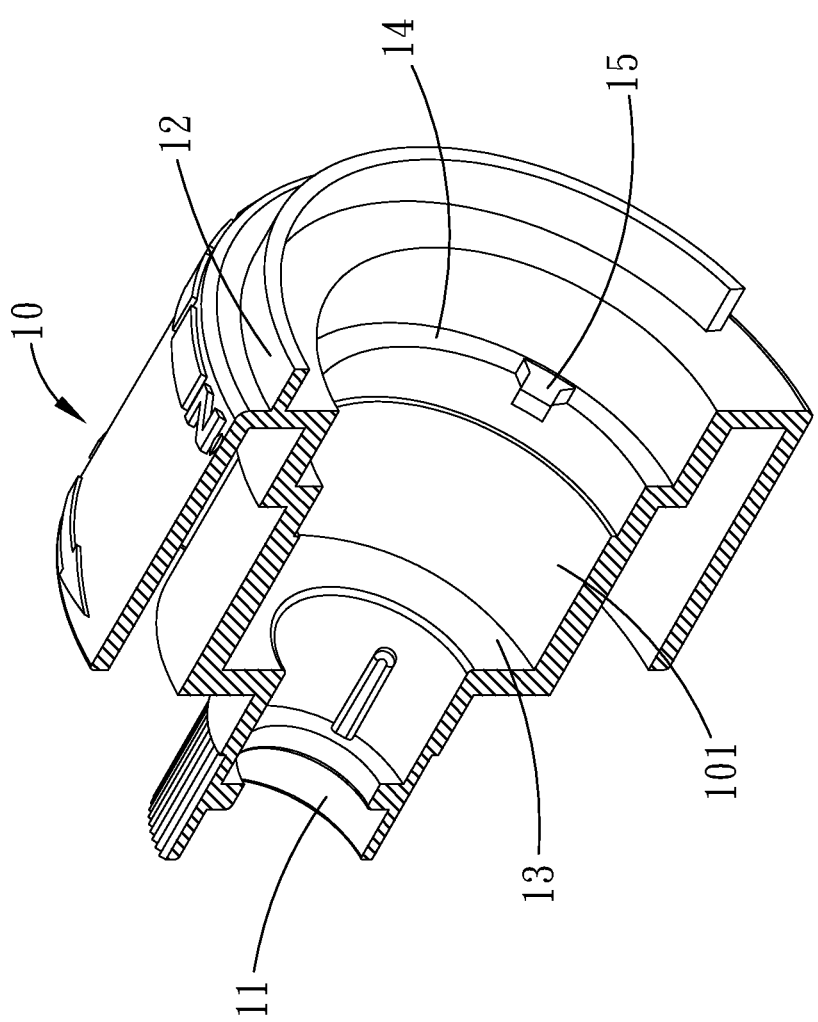
FIG. 2 is a cross-sectional perspective view showing the assembly of a body of the control structure according to the preferred embodiment of the present invention.
Figure 3:
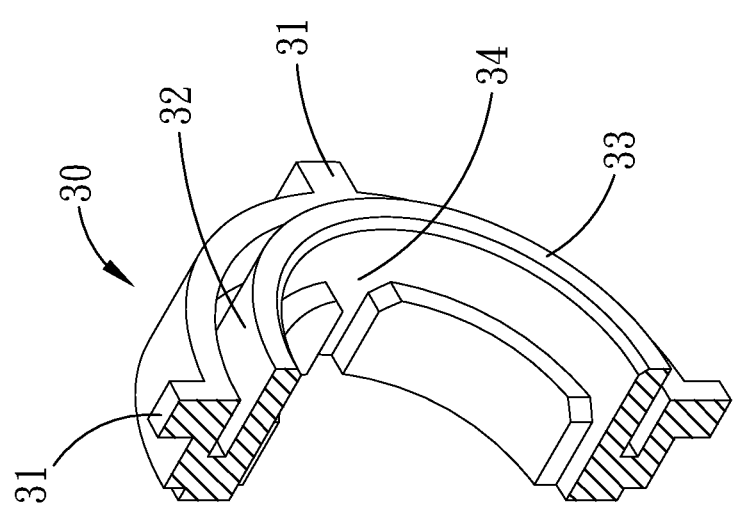
FIG. 3 is a cross-sectional perspective view showing the assembly of a retainer of the control structure according to the preferred embodiment of the present invention.
Figure 4:
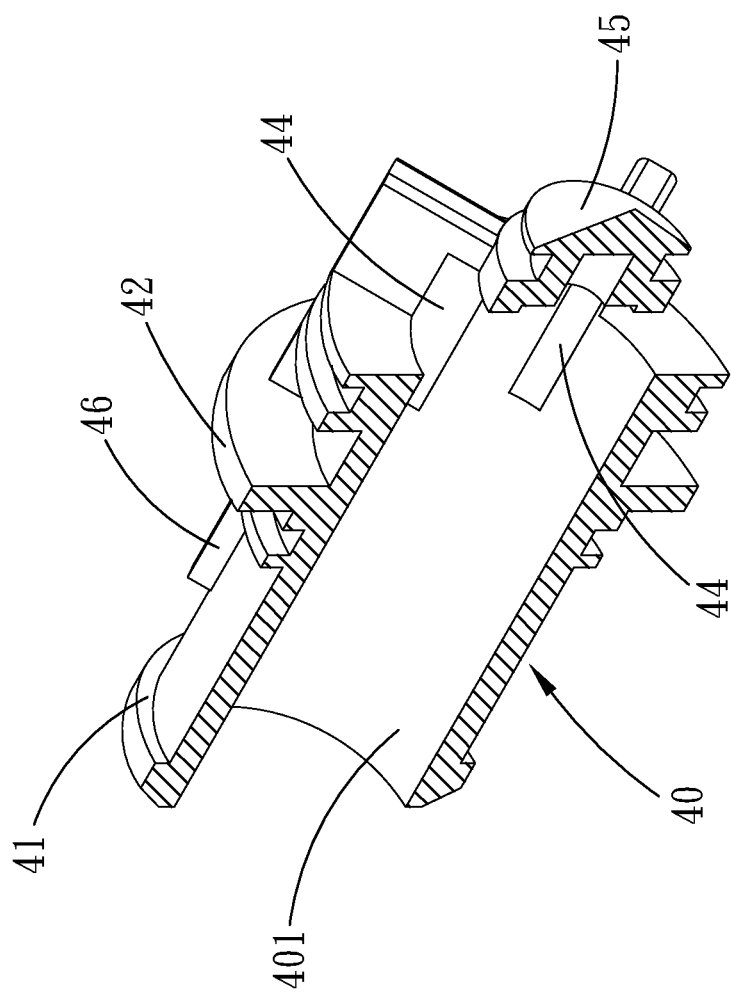
FIG. 4 is a cross-sectional perspective view showing the assembly of a valve stem of the control structure according to the preferred embodiment of the present invention.
Figure 5:
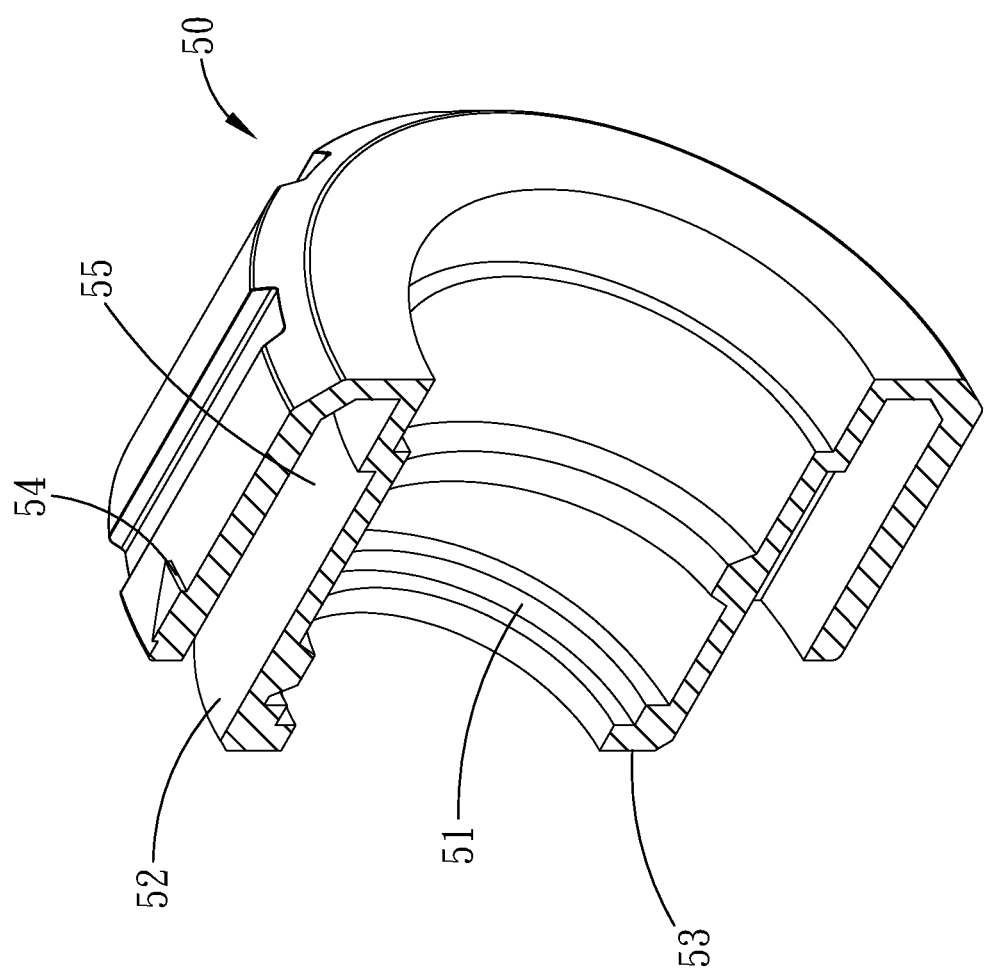
FIG. 5 is a cross-sectional perspective view showing the assembly of an adjuster of the control structure according to the preferred embodiment of the present invention.
Figure 6:
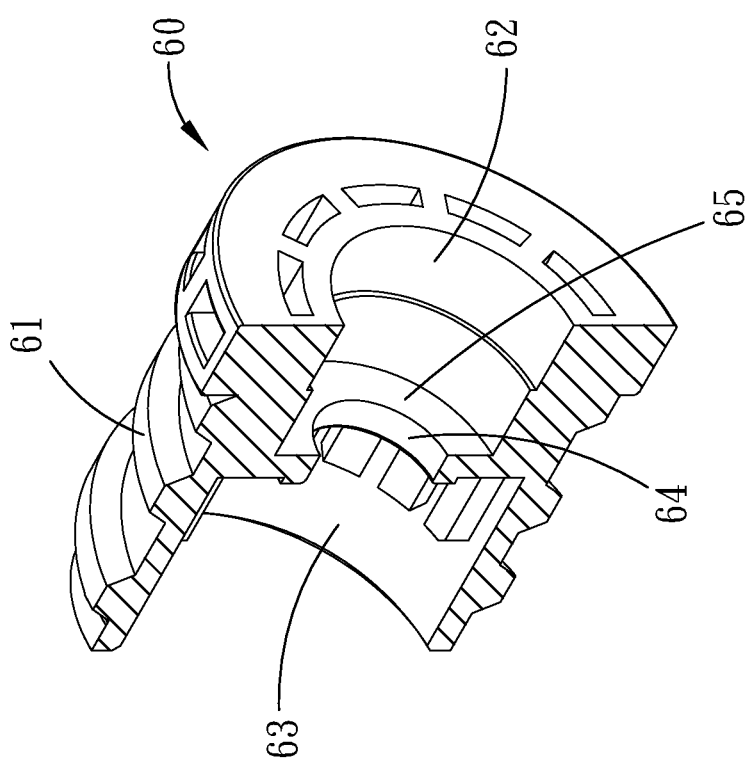
FIG. 6 is a cross-sectional perspective view showing the assembly of a controller of the control structure according to the preferred embodiment of the present invention.

With reference to FIGS. 1 to 6, a control structure capable of adjusting water volume and controlling water supply according to a preferred embodiment of the present invention comprises: a body 10, a fixer 20, a retainer 30, a valve stem 40, an adjuster 50, and a controller 60.

The body 10 includes an accommodation groove 101 defined therein, a water outflow segment 11 formed on a first end of the body 10 and configured to connect with a watering tool (such as a sprinkler, a water spray gun or a water supply pipe), a connection section 12 formed on a second end of the body 10. In an embodiment, a diameter of the outflow segment 11 is less than the connection section 12. The body 10 further includes a first shoulder 13 and a second shoulder 14 which are defined on an inner wall of the accommodation groove 101, and multiple locking recesses 15 defined on the second shoulder 14. The fixer 20 is tubular and includes a flexible retaining rib 21 arranged around an inner wall of the fixer 20. The retainer 30 includes a plurality of first engagement blocks 31 extending outward from an outer wall of the retainer 30, a first fitting section 32 formed on a first end of the retainer 30, a stop rib 33 formed on the first fitting section 32, and a trench 34 defined on an inner wall of the retainer 30.

In an embodiment, a diameter of the first end of the retainer 30 is less than a second end of the retainer 30. The valve stem 40 includes an inlet 401 defined therein, a fixing rib 41 arranged on a first end of the valve stem 40, an abutting rib 42 extending outward from a middle section of an outer wall of the valve stem 40, two first seal rings 43 fitted on two sides of the abutting rib 42 respectively, an opening 44 separated by a cross-shaped partition on a second end of the valve stem 40 and communicating with the inlet 401, and a conical guiding column 45 extending outward from a side of the opening 44. A diameter of the guiding column 45 is less than the opening 44 in an embodiment, and the guiding column 45 has a second seal ring 451 fitted thereon.

The valve stem 40 further includes a plurality of second engagement blocks 46 extending around an outer wall of the valve stem 40. The adjuster 50 includes a coupling section 52 having a threaded orifice 51, a contacting face 53 extending inward from a first end of the adjuster 50, and a second fitting section 54 extending adjacent to the coupling section 52. In an embodiment, a diameter of the second fitting section 54 is more than the coupling section 52. The adjuster 50 further includes a housing space 55 defined between the coupling section 52 and the second fitting section 54. The controller 60 includes a screwing section 61 arranged on an outer wall thereof, an inflow aperture 64 formed on a middle section of an inner wall of the controller 60, a third shoulder 65 formed beside the inflow aperture 64 and adjacent to a first end of the controller 60, a joining section 62 arranged on the inner wall of the controller 60 proximate to the first end of the controller 60, an inlet segment 63 arranged on the inner wall of the controller 60 adjacent to a second end of the controller 60 and connected with a water hose (not shown).

Figure 7:
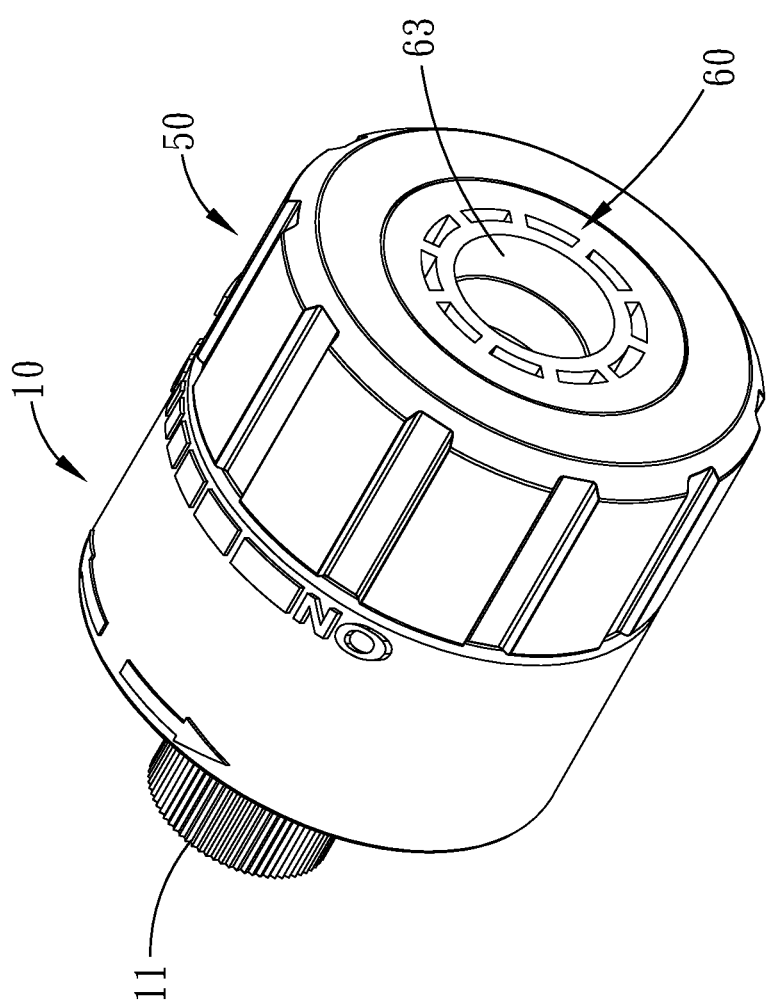
FIG. 7 is a perspective view showing the assembly of the control structure according to the preferred embodiment of the present invention.
Figure 8:
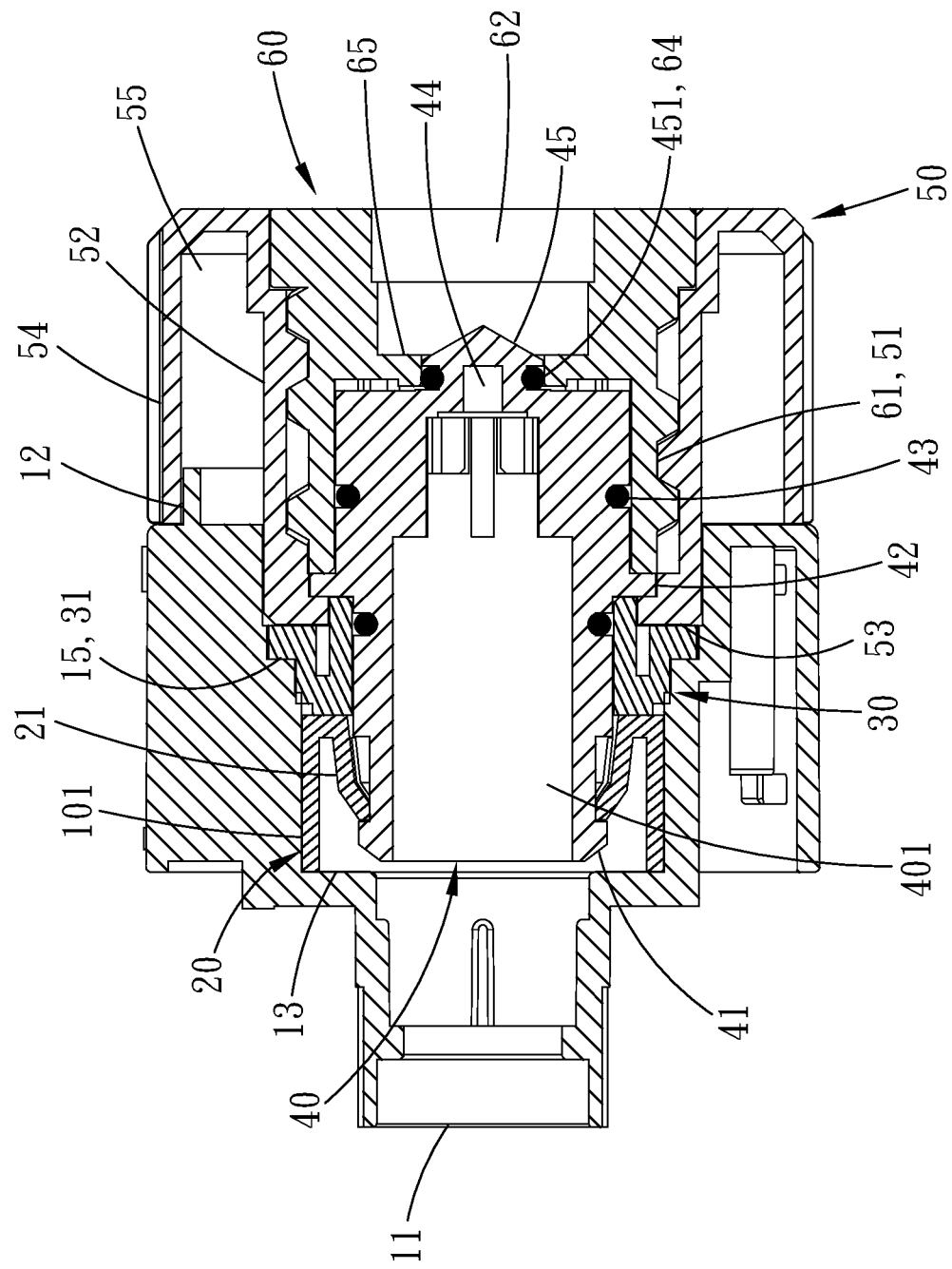
FIG. 8 is a cross sectional view showing the operation of the control structure according to the preferred embodiment of the present invention.

Referring to FIGS. 7 and 8, in assembly, the fixer 20 and the retainer 30 are accommodated in the accommodation groove 101 of the body 10 so that the fixer 20 abuts against the first shoulder 13, and the plurality of first engagement blocks 31 are retained in the multiple locking recesses 15 respectively. The fixer 20 and the retainer 30 are adhered with the body 10 in a ultrasonic bonding manner, and the coupling section 52 of the adjuster 50 is fitted into the accommodation groove 101 of the body 10 so as to abut against the plurality of first engagement blocks 31 and the second shoulder 14, the contacting face 53 connects with the first fitting section 32 and flushes with the stop rib 33, and the connection section 12 of the body 10 is located in the housing space 55 and is fitted with the second fitting section 54. Thereafter, the plurality of second engagement blocks 46 of the valve stem 40 are pushed into the fixer 20 from the threaded orifice 51 of the adjuster 50 along the trench 34 of the retainer 30 so that the fixing rib 41 retains with the flexible retaining rib 21 of the fixer 20, hence the plurality of second engagement blocks 46 are locked in the trench 34, the abutting rib 42 abuts against the contacting face 53 of the adjuster 50 and the first fitting section 32 of the retainer 30, and the contacting face 53 contacts with the second shoulder 14 of the body 10 and the abutting rib 42 of the valve stem 40 and rotates along the accommodation groove 101 and the connection section 12 clockwise or counterclockwise. The screwing section 61 of the controller 60 is screwed into the guiding column 45 of the valve stem 40 along the threaded orifice 51 of the adjuster 50 and extends out of the inflow aperture 64. In the meantime, the third shoulder 65 is biased against the valve stem 40 so as to stop the controller 60, and the joining section 62 is fitted on the valve stem 40. Preferably, the two first seal rings 43 and the second seal ring 451 respectively contact with the retainer 30, the joining section 62, and the inflow aperture 64 so as to stop water flowing from the opening 44.

Figure 9:
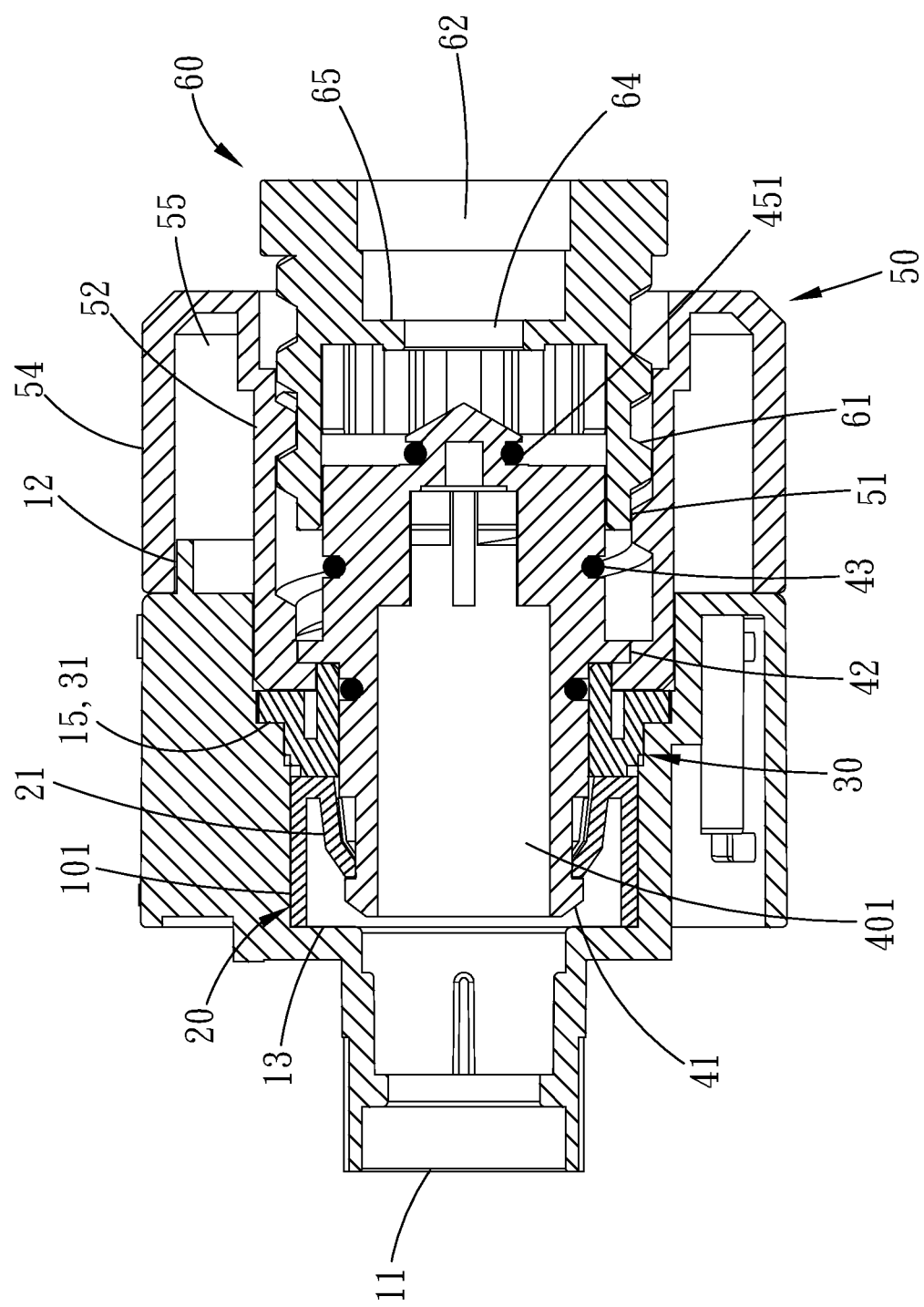
FIG. 9 is another cross sectional view showing the operation of the control structure according to the preferred embodiment of the present invention.

As shown in FIG. 9, in application, a water supply pipe (not shown) is in connection with the inlet segment 63 of the controller 60, and the sprinkler, the water spray gun or a water hose is coupled with the water outflow segment 11 of the body 10. When the water from the water supply pipe is too large or small, the adjuster 50 is rotated clockwise along the accommodation groove 101 and the connection section 12 of the body 10 so that the threaded orifice 51 of the adjuster 50 drives the screwing section 61 of the controller 60 to remove, and the inflow aperture 64 detaches from the two first seal rings 43 of the guiding column 45, hence the water flows into the inlet 401 from the opening 44 of the valve stem 40 and sprays out of the watering tool from the water outflow segment 11 of the body 10. The adjuster 50 is rotated continuously so as to increase a distance between the inflow aperture 64 of the controller 60 and the valve stem 40 and to increase water volume. When the adjuster 50 is rotated counterclockwise to drive the controller 60 to move toward the guiding column 45, a distance between the inflow aperture 64 of the controller 60 and the guiding column 45 decrease, such that the water column decreases. When the inflow aperture 64 contacts with the second seal ring 451 of the valve stem 40, the water stops flowing. Thereby, the control structure is capable of adjusting water volume and controlling the water supply easily. In addition, the adjuster 50 is limited by the valve stem 40 to rotate on an original position and to drive the controller 60 to move forward and backward, thus changing the water volume easily.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A control structure capable of adjusting water volume and controlling water supply, the control structure for use with a controller coupled to a water supply pipe, the control structure comprising:
 a body including a water outflow segment formed on a first end of the body and configured to connect with a watering tool, an accommodation groove configured to accommodate a fixer and a valve stem, the fixer including a retaining rib arranged around an inner wall of the fixer, the valve stem including an inlet defined in the valve stem and communicating with the water outflow segment of the body, a fixing rib arranged on a first end of the valve stem, an opening formed on a second end of the valve stem and communicating with the inlet, and a guiding column extending outward from a side of the opening, wherein a diameter of the guiding column is less than the opening, and the guiding column has a seal ring fitted thereon, the fixing rib of the valve stem retains with the retaining rib of the fixer so as to limit a rotation of an adjuster along the body, and the adjuster includes a threaded orifice screwing with a screwing section arranged on an outer wall of the controller, an inflow aperture formed on a middle section of an inner wall of the controller and fitting with the guiding column, and a shoulder formed beside the inflow aperture.

2. The control structure as claimed in claim 1, wherein the body includes a connection section formed on a second end thereof and configured to fit with the adjuster, a first shoulder and a second shoulder which are defined on an inner wall of the accommodation groove, wherein the first shoulder abuts against the fixer, and multiple locking recesses are defined on the second shoulder of the body and are configured to retain with a plurality of first engagement blocks of the retainer respectively; the retainer includes a first fitting section formed on a first end thereof, a stop rib formed on the first fitting section, and a trench defined on an inner wall of the retainer, wherein a diameter of the first end of the retainer is less than a second end of the retainer, and the trench locks with a plurality of second engagement blocks of the valve stem; the valve stem includes an abutting rib extending outward from a middle section of an outer wall of the valve stem, two first seal rings fitted on two sides of the abutting rib respectively; the adjuster includes a coupling section, a contacting face extending inward from an end of the adjuster, and a second fitting section extending adjacent to the coupling section, wherein a diameter of the second fitting section is more than the coupling section, and the adjuster further includes a housing space defined between the coupling section and the second fitting section, wherein the fixer and the retainer are adhered with the body in an ultrasonic bonding manner.

3. The control structure as claimed in claim 1, wherein the retaining rib is flexible.

4. The control structure as claimed in claim 1, wherein the opening is separated by a cross-shaped partition on the second end of the valve stem.

5. The control structure as claimed in claim 1, wherein the guiding column is conical.

6. A control structure capable of adjusting water volume and controlling water supply comprising:
  a fixer including a retaining rib arranged around an inner wall of the fixer;
  a valve stem including:
  an inlet defined in the valve stem,
  a fixing rib arranged on a first end of the valve stem,
  an opening formed on a second end of the valve stem, the opening formed on the second end of the valve stem communicating with the inlet, and
  a guiding column extending outward from a side of the opening, the guiding column having a diameter less than a diameter of the opening and having a seal ring fitted thereon;
  a body including:
  a water outflow segment formed on a first end of the body and configured to connect with a watering tool, and
  an accommodation groove configured to accommodate the fixer and the valve stem, the valve stem communicating with the water outflow segment of the body;
  a controller coupled with a water supply pipe, the controller including:
  a screwing section arranged on an outer wall of the controller,
  an inflow aperture formed on a middle section of an inner wall of the controller, and
  a shoulder formed beside the inflow aperture; and
  an adjuster including a threaded orifice screwing with the screwing section of the controller and fitting with the guiding column, wherein the fixing rib of the valve stem retains with the retaining rib of the fixer so as to limit a rotation of the adjuster along the body.

7. The control structure as claimed in claim 6, wherein the body includes:
  a connection section formed on a second end thereof and configured to fit with the adjuster, and
  a first shoulder and a second shoulder which are defined on an inner wall of the accommodation groove, wherein the first shoulder abuts against the fixer, and multiple locking recesses are defined on the second shoulder of the body and are configured to retain with a plurality of first engagement blocks of the retainer respectively.

8. The control structure as claimed in claim 6, further comprising a retainer including:
  a first fitting section formed on a first end thereof,
  a stop rib formed on the first fitting section, and
  a trench defined on an inner wall of the retainer, wherein a diameter of the first end of the retainer is less than a second end of the retainer, and the trench locks with a plurality of second engagement blocks of the valve stem.

9. The control structure as claimed in claim 6, wherein the valve stem includes:
  an abutting rib extending outward from a middle section of an outer wall of the valve stem, and
  two first seal rings fitted on two sides of the abutting rib respectively.

10. The control structure as claimed in claim 6, wherein the adjuster includes:
  a coupling section,
  a contacting face extending inward from an end of the adjuster,
  a second fitting section extending adjacent to the coupling section, wherein a diameter of the second fitting section is more than the coupling section, and
  a housing space defined between the coupling section and the second fitting section.

11. The control structure as claimed in claim 6, wherein the fixer and the retainer are adhered with the body in an ultrasonic bonding manner.

12. The control structure as claimed in claim 6, wherein the retaining rib is flexible.

13. The control structure as claimed in claim 6, wherein the opening is separated by a cross-shaped partition on the second end of the valve stem.

14. The control structure as claimed in claim 6, wherein the guiding column is conical.

* * * * *